United States Patent
Kim et al.

(10) Patent No.: US 8,714,805 B2
(45) Date of Patent: May 6, 2014

(54) LIGHT GUIDE PLATE OF DISPLAY APPARATUS

(75) Inventors: Guk Hyun Kim, Yongin-si (KR); Oleg Prudnikov, Suwon-si (KR); Youngchan Kim, Incheon (KR); Byoungho Cheong, Yongin-si (KR)

(73) Assignee: Samsung Display Co., Ltd. (KR)

( * ) Notice: Subject to any disclaimer, the term of this patent is extended or adjusted under 35 U.S.C. 154(b) by 199 days.

(21) Appl. No.: 13/344,020

(22) Filed: Jan. 5, 2012

(65) Prior Publication Data

US 2012/0294034 A1    Nov. 22, 2012

(30) Foreign Application Priority Data

May 19, 2011  (KR) .................. 10-2011-0047453

(51) Int. Cl.
*F21V 8/00*  (2006.01)
*F21V 7/09*  (2006.01)

(52) U.S. Cl.
USPC .............. 362/621; 362/608; 362/615; 349/65

(58) Field of Classification Search
USPC .................. 362/615, 621, 606, 97.2, 97.3, 362/608–611; 349/65
See application file for complete search history.

(56) References Cited

U.S. PATENT DOCUMENTS

| | | | |
|---|---|---|---|
| 6,979,095 B2 * | 12/2005 | Min et al. | 362/611 |
| 7,660,047 B1 | 2/2010 | Travis et al. | |
| 2006/0203511 A1 * | 9/2006 | Tseng | 362/608 |
| 2011/0128471 A1 * | 6/2011 | Suckling et al. | 349/62 |
| 2011/0292321 A1 * | 12/2011 | Travis et al. | 349/65 |

FOREIGN PATENT DOCUMENTS

| JP | 2005-353506 A | 12/2005 |
|---|---|---|
| KR | 1020080054921 A | 6/2008 |
| KR | 1020090117419 A | 11/2009 |

OTHER PUBLICATIONS

Travis, et al., Collimated light from a waveguide for a display backlight, Oct. 26, 2009/vol. 17, No. 22/ Optics Express pp. 19714-19719.

* cited by examiner

*Primary Examiner* — Karabi Guharay
(74) *Attorney, Agent, or Firm* — Cantor Colburn LLP

(57) ABSTRACT

A display apparatus includes a light source and a light guide plate including a light incident surface facing the light source and which receive the light, an opposite surface opposite to the light incident surface and which reflects the light and has an arc shape, connection surfaces at opposing sides of the light incident surface and which connect the light incident surface and the opposite surface, an upper surface connected to the light incident surface, the opposite surface and the connection surfaces and which outputs the light, and a lower surface opposite to the upper surface. The light incident surface of the light guide plate includes a first surface extending in a predetermined direction, and second surfaces inclined from the first surface in an area corresponding to the light source such that an optical recess having a polygonal pyramid shape is defined by the second surfaces.

10 Claims, 17 Drawing Sheets

LIGHT GUIDE PLATE OF DISPLAY APPARATUS

This application claims priority to Korean Patent Application No. 10-2011-0047453, filed on May 19, 2011, and all the benefits accruing therefrom under 35 U.S.C. §119, the content of which in its entirety is herein incorporated by reference.

BACKGROUND OF THE INVENTION

1. Field of the Invention

Exemplary embodiments of the invention relate to a display apparatus. More particularly, exemplary embodiments of the invention relate to a display apparatus with improved display quality and reduced light loss.

2. Description of the Related Art

A liquid crystal display typically includes a display panel which displays an image and a backlight unit that provides light to the display panel.

The backlight unit includes a light source that emits light and a light guide plate that guides the light to the display panel. As the light source, a line light source such as a cold cathode fluorescent lamp or a point light source such as a light emitting diode is used. The light guide plate transforms the light from the line or point light source into light from a surface light and guides the surface light to the display panel.

However, the point light source typically has substantially reduced power consumption and slimness.

BRIEF SUMMARY OF THE INVENTION

Exemplary embodiments of the invention provide a display apparatus with improved display quality and reduced light loss.

According to an exemplary embodiment, a display apparatus includes at least one light source which emits light, a light guide plate which guides the light, and a display panel which receives the light from the light guide plate and displays an image. The light guide plate includes a light incident surface facing the at least one light source and which receive the light, an opposite surface opposite to the light incident surface and which reflects the light and has an arc shape, connection surfaces at opposing sides of the light incident surface and which connect the light incident surface and the opposite surface, an upper surface connected to the light incident surface, the opposite surface, and the connection surfaces and which outputs the light, and a lower surface opposite to the upper surface. The light incident surface of the light guide plate includes a first surface extending in a predetermined direction, and a plurality of second surfaces inclined from the first surface in an area corresponding to the light source such that at least one optical recess having a polygonal pyramid shape is defined by the second surfaces on the light incident surface.

According to an exemplary embodiment, a display apparatus includes at least one light source which emits light, a light guide plate, an optical member and a display panel. The light guide plate includes a light incident surface facing the light source and which receives the light, an opposite surface opposite to the light incident surface and which reflects the light and has an arc shape, connection surfaces at opposing sides of the light incident surface and which connects the light incident surface and the opposite surface, an upper surface connected to the light incident surface, the opposite surface, and the connection surfaces and which output the light, and a lower surface opposite to the upper surface. The optical member includes a first surface between the light incident surface and the light source and facing the light source, a plurality of second surfaces inclined from the light incident surface to the light source and which connects the light incident surface with the first surface, and a plurality of third surfaces vertical to the light incident surface and which connects the light incident surface with the first surface. The display panel receives the light from the light guide plate and displays an image.

In an exemplary embodiment, the light guide plate includes the light incident surface facing the light source and the opposite surface opposite to the light incident surface. The light incident surface may include the optical recess corresponding to the light source, and the opposite surface has the arc shape.

In an exemplary embodiment, the light emitted passing through the optical recess from the light source has rectangular brightness distribution such that an exit light distribution of the light guide plate has the exit light distribution in a rectangular shape. Thus, dark areas of the light guide plate are substantially reduced, and display quality of the display apparatus is thereby substantially improved.

BRIEF DESCRIPTION OF THE DRAWINGS

The above and other aspects and features of the invention will become readily apparent by reference to the following detailed description when considered in conjunction with the accompanying drawings wherein.

DETAILED DESCRIPTION OF THE INVENTION

Hereinafter, exemplary embodiments of the invention will be explained in detail with reference to the accompanying drawings.

Figure 1:
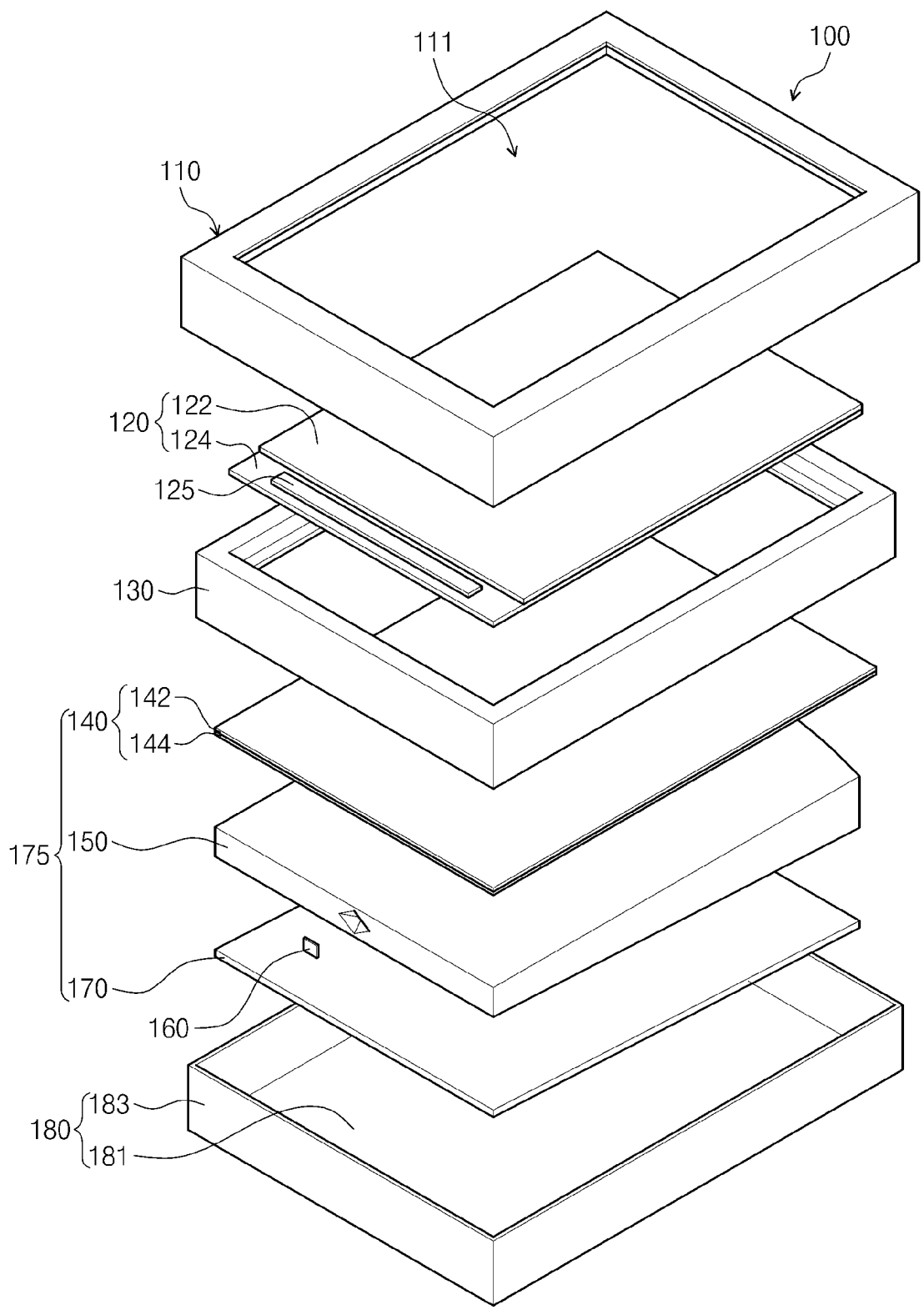
FIG. 1 is an exploded perspective view of an exemplary embodiment of a display apparatus according to the invention.

FIG. 1 is an exploded perspective view of an exemplary embodiment of a display apparatus according to the invention.

Referring to FIG. 1, a display apparatus 100 includes a display panel 120, a mold frame 130, a backlight assembly 175, a bottom chassis 180, and a top chassis 110.

The display panel 120 displays an image on one surface thereof. The display panel 120 is not a self-emissive device and may be various display panels, such as a liquid crystal display panel and an electrophoretic display panel, for example. Hereinafter, an exemplary embodiment where the display panel 120 is a liquid crystal display panel will be described in detail.

The display panel 120 has a rectangular plate-like shape. The display panel 120 includes a first substrate 122, a second substrate 124, and a liquid crystal layer (not shown) interposed between the first substrate 122 and the second substrate 124.

In an exemplary embodiment, the first substrate 122 may include a plurality of pixel electrodes (not shown) and a plurality of thin film transistors (not shown) electrically connected to the pixel electrodes in a one-to-one correspondence. Each thin film transistor is driven to be turned on or turned off to apply a driving signal to a corresponding pixel electrode of the pixel electrodes. The second substrate 124 may include a common electrode (not shown) that forms an electric field along with the pixel electrodes to control an alignment of liquid crystal molecules in the liquid crystal layer. The display panel 120 controls a light transmittance of the liquid crystal layer based on the intensity of the electric field, thereby displaying the image.

A driving chip 125 may be disposed, e.g., mounted, on the first substrate 122 to apply the driving signal to the display panel 120. In an exemplary embodiment, the driving chip 125 may include a data driver and a gate driver, which are built therein. In an alternative exemplary embodiment, however, the data driver may be built in the driving chip 125 and the gate driver may be directly integrated on the first substrate through a thin film process.

In an exemplary embodiment, the mold frame 130 has a rectangular frame shape corresponding to the shape of the display panel 120 and is disposed under the display panel 120 to support the display panel 120.

The backlight assembly 175 is provided under the display panel 120 to provide light to the display panel 120. In an exemplary embodiment, the backlight assembly 175 includes a light source 160 that emits the light, a light guide plate 150 that guides the light to the display panel 120, an optical sheet 140 that improves light efficiency, and a reflection sheet 170 that reflects the light leaking from the light guide plate 150.

In an exemplary embodiment, the light source 160 may include at least one light emitting diode. Hereinafter, an exemplary embodiment where the light source 160 includes one light emitting diode will be described in detail. However, the invention is not limited thereto. The at least one light emitting diode may be disposed, mounted on, a circuit board (not shown) and disposed adjacent to at least one side surface of the light guide plate 150. In an exemplary embodiment, the circuit board may be a flexible circuit board.

The light guide plate 150 is provided under the display panel 120 to guide the light to the display panel 120. The light guide plate 150 will be described later in greater detail with reference to FIGS. 2 to 4.

The optical sheet 140 is provided between the light guide plate 150 and the display panel 120. The optical sheet 140 may include a prism sheet 144 and a protection sheet 142, which are sequentially stacked on the light guide plate.

The prism sheet 144 condenses the light exiting from the light guide plate 150 in a direction substantially vertical to a display surface of the display panel 120 disposed thereabove incident into the display panel 120. The light passing through the prism sheet 144 is vertically incident into the display panel 120. The protection sheet 142 is disposed on the prism sheet 144. The protection sheet 142 protects the prism sheet 144 from external impacts. Although not shown in FIG. 1, the optical sheet 140 may further include a diffusion sheet to diffuse the light exiting from the light guide plate 150. In an exemplary embodiment, the diffusion sheet may be disposed between the light guide plate 150 and the prism sheet 144.

The reflection sheet 170 is disposed under the light guide plate 150 to reflect the light leaking from the light guide plate 150 without being directed to the display panel 120, such that the reflected light is incident into the light guide plate 150 again. In such an embodiment, the total amount of the light provided to the display panel 120 is substantially enhanced by the reflection sheet 170.

The bottom chassis 180 is provided under the backlight assembly 175 to accommodate the backlight assembly 175. In such an embodiment, the bottom chassis 180 may include a bottom portion 181 substantially parallel to a lower surface of the reflection sheet 170 and side portions 183 bent from and upwardly extended from the bottom portion 181. The backlight assembly 175 is accommodated in a space defined by the bottom portion 181 and the side portions 183.

The top chassis 110 is disposed on the display panel 120. The top chassis 110 may press a peripheral portion of an upper surface of the display panel 120 and cover a side surface of the mold frame 130 or the bottom chassis 180. The top chassis 110 is provided with a display window 111 formed therethrough to expose a display area of the display panel 120.

Figure 2:
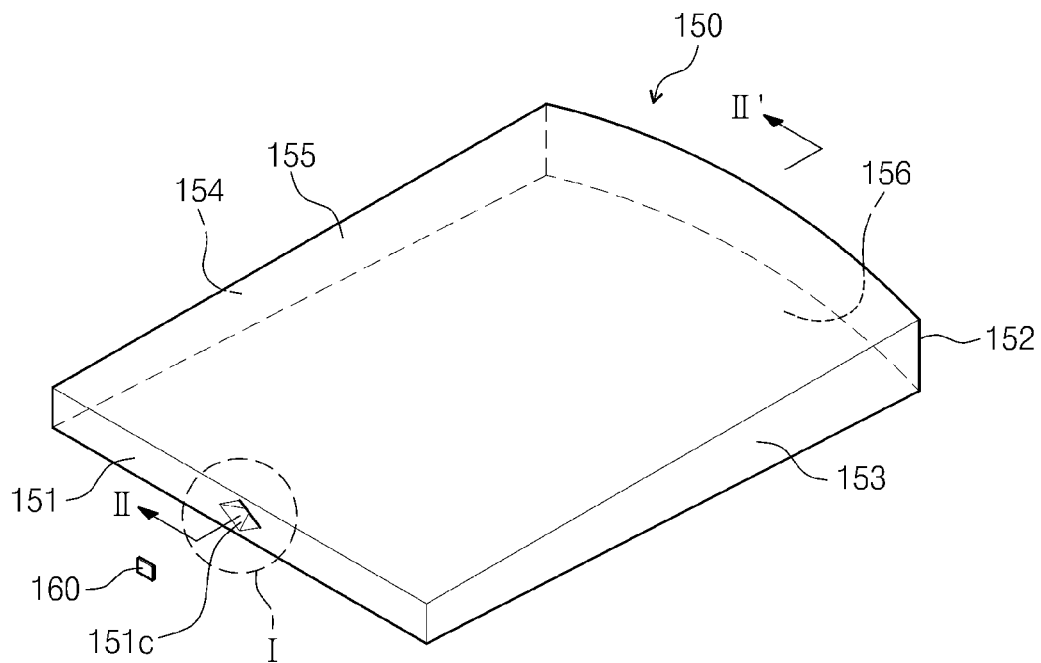
FIG. 2 is a perspective view of an exemplary embodiment of a light guide plate shown in FIG. 1.
Figure 3:
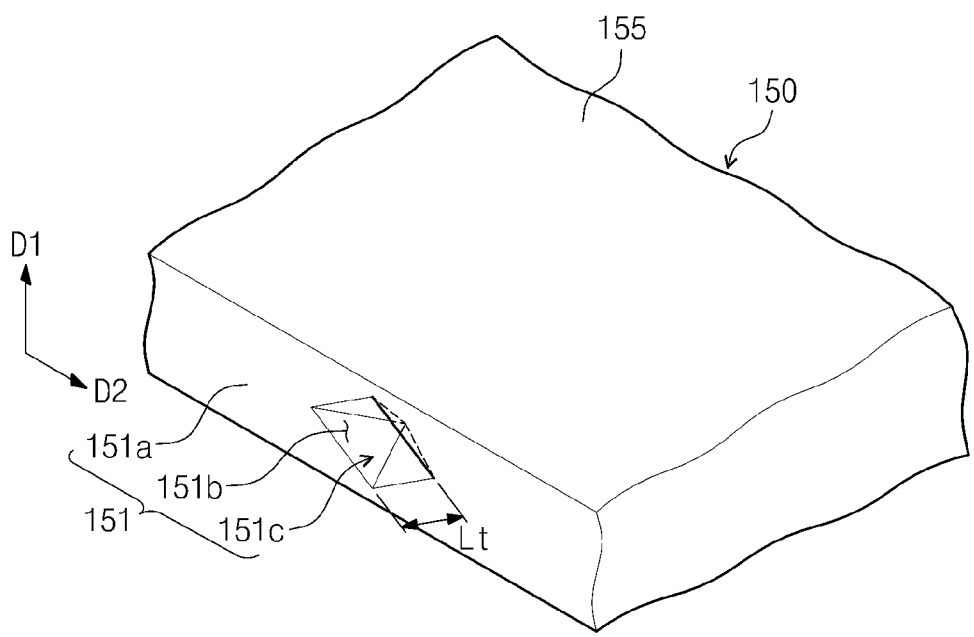
FIG. 3 is an enlarged perspective view of portion I of the light guide plate shown in FIG. 2.
Figure 4A:
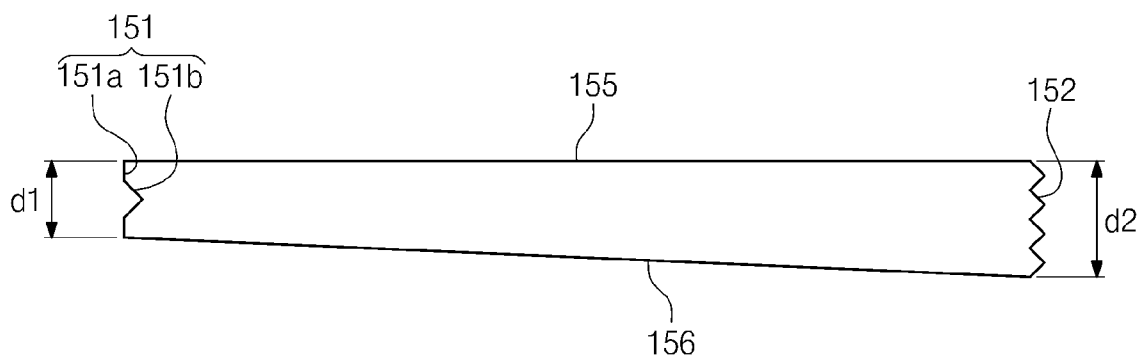
FIG. 4A is a cross-sectional view taken along line II-II' of the light guide plate shown in FIG. 2.
Figure 4B:
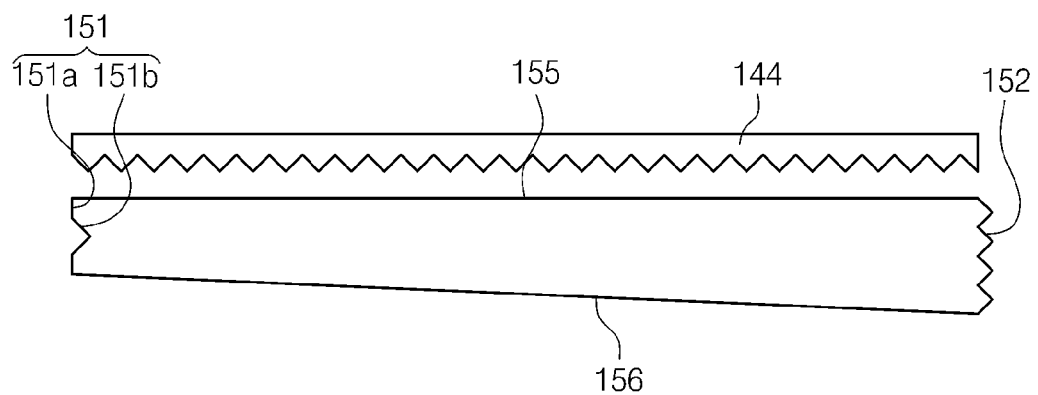
FIG. 4B is a cross-sectional view of an alternative exemplary embodiment of a light guide plate according to the invention.

FIG. 2 is a perspective view of an exemplary embodiment of the light guide plate shown in FIG. 1, FIG. 3 is an enlarged perspective view of portion I of the light guide plate shown in FIG. 2, FIG. 4A is a cross-sectional view taken along line II-II' of the light guide plate shown in FIG. 2, and FIG. 4B is a cross-sectional view of an alternative exemplary embodiment of a light guide plate according to the invention.

Referring to FIGS. 2 and 3, the light guide plate 150 includes a plurality of surfaces. The plurality of surfaces of the light guide plate may include a light incident surface 151, an opposite surface 152, a first connection surface 153, a second connection surface 154, an upper surface 155 and a lower surface 156.

The light incident surface 151 is disposed opposite to, e.g., facing, the light source 160, and the light emitting from the light source 160 is incident into the light incident surface 151. The opposite surface 152 is disposed opposite to the light incident surface 151 to reflect the light incident into the light incident surface 151. In one exemplary embodiment, for example, the opposite surface 152 has an arc shape. The first and second connection surfaces 153 and 154 connect side ends of the light incident surface 151 with side ends of the opposite surface 152, respectively. The upper surface 155 is connected with upper ends of the light incident surface 151, the opposite surface 152, the first connection surface 153 and the second connection surface 154, and outputs the light guided by the light guide plate 150. The lower surface 156 faces the upper surface 155 and reflects the incident light to the upper surface 155.

Referring to FIG. 3, the light incident surface 151 of the light guide plate 150 includes a first surface 151a and a plurality of second surfaces 151b. The second surfaces 151b are inclined to the opposite surface 152 from the first surface 151a in an area corresponding to the light source 160. In such an embodiment, at least one optical recess 151c having a polygonal pyramid shape is defined by the second surfaces 151b at the light incident surface 151 of the light guide plate 150. In such an embodiment, the optical recess 151c is recessed to the opposite surface 152 from the light incident surface 151 to have the polygonal pyramid.

In one exemplary embodiment, for example, the light incident surface 151 includes four second surfaces 151b, and the light incident surface 151 is provided with one optical recess 151c having a quadrangular pyramid shape defined by the four second surfaces 151b. In an alternative exemplary embodiment, however, the shape of the optical recess 151c is not limited to the quadrangular pyramid shape.

In an exemplary embodiment, the optical recess 151c may have a size larger than a size of the light source 160. In an exemplary embodiment, a length of a bottom side Lt of each of the second surfaces 151b, which define the optical recess 151c, is greater than the size of the light source 160, and substantially an entire portion of the light emitted from the light source 160 is thereby incident into the light guide plate 150 after passing through the optical recess 151c. In an exemplary embodiment, the bottom sides Lt of the second surfaces 151b may collectively define a lozenge shape on the light incident surface 151.

As shown in FIG. 2, the opposite surface 152 faces the light incident surface 151 and has an arc shape. In such an embodiment, since the opposite surface 152 has the arc shape, the light reflected by the opposite surface 152 travels in a specific direction even though the light travels to the opposite surface in various directions. In an exemplary embodiment, the light traveling to the opposite surface 152 in the various directions is substantially uniformly reflected by the opposite surface 152 toward the light incident surface 151. In such an embodiment, the light source 160 may be positioned at a focal length of the opposite surface 152.

In an exemplary embodiment, the upper surface 155 is substantially parallel to the display panel 120, and the lower surface 156 faces the upper surface 155. In such an embodiment, since the light incident into the light guide plate 150 through the light incident surface 151 is provided to the display panel 120 through the upper surface 155, the upper surface 155 may be referred to as a light exit surface.

The first connection surface 153 connects a side end of the light incident surface 151 and a side end of the opposite surface 152, and the second connection surface 154 connects another side end of the light incident surface 151 and another side end of the opposite surface 152. In such an embodiment, the first and second connections 153 and 154 may be substantially parallel to each other.

Referring to FIG. 4A, a distance between the upper surface 155 and the lower surface 156 of the light guide plate 150 is increased as it goes from the light incident surface 151 toward the opposite surface 152. When the distance between the upper surface 155 and the lower surface 156 at a position close to the light incident surface 151 is referred to as a first distance d1, and a distance between the upper surface 155 and the lower surface 156 at a position close to the opposite surface 152 is referred to as a second distance d2, the second distance d2 is greater than the first distance d1.

In an exemplary embodiment, as shown in FIG. 4A, the light guide plate 150 has a structure in which the upper surface 155 is flat and the lower surface 156 is inclined with respect to the upper surface 155. However, the structure of the light guide plate 150 should not be limited thereto. In an alternative exemplary embodiment, the light guide plate 150 may have a structure in which the lower surface 156 is flat and the upper surface 155 is inclined with respect to the lower surface 156.

In an exemplary embodiment, where the light guide plate 150 is a wedge-shaped Fresnel lens plate, the light incident through the light incident surface 151 are reflected several times by the upper surface 155, the lower surface 156 and the opposite surface 152 and exits through the upper surface 155. The light incident through the light incident surface 151 is reflected by the opposite surface 152, and then the reflected light is repeatedly reflected by the upper surface 155 and the lower surface 156.

As shown in FIG. 4A, the opposite surface 152 may be a non-flat surface, e.g., a wavy surface or a saw-tooth shaped surface. In an exemplary embodiment, the opposite surface 152 may have a shape in which mountains and valleys are alternately arranged. In an exemplary embodiment, the mountains and valleys may be extended in a direction substantially perpendicular to a direction in which the upper surface 155 and the lower surface 156 are spaced apart from each other (e.g., the direction in which the first distance d1 or the second direction d2 is defined). In an exemplary embodiment, each of the mountains and valleys has an arc shape. In an exemplary embodiment, a cross-sectional shape of the opposite surface 152 shown in FIG. 4A, which is taken along line II-II' of the light guide plate 150 in FIG. 2, may be a zigzag shape. The opposite surface 152 reflects the light traveling thereto toward the upper surface 155 or the lower surface 156.

In an exemplary embodiment, the thickness of the light guide plate 150 is linearly varied from the light incident surface 155 to the opposite surface 152, and the traveling direction of the light exiting from the upper surface 155 of the light guide plate 150 is thereby changed. In such an embodiment, where the thickness of the light guide plate 150 is gradually increased from the light incident surface 155 to the opposite surface 152, the light exiting from the upper surface 155 of the light guide plate 150 may be condensed such that the light travels in a direction substantially vertical to the lower surface of the display panel 120.

As shown in FIG. 4B, the prism sheet 144 disposed above the upper surface 155 of the light guide plate 150 may be a reverse prism sheet whose prism bulges (e.g., prism patterns) are disposed opposite to, e.g., facing, the upper surface 155 of the light guide plate 150. The reverse prism sheet includes the prism patterns provided on a surface thereof facing the upper surface 155 of the light guide plate 150. The prism patterns may be arranged on the surface in parallel with each other. The reverse prism sheet changes optical paths of the light exiting through the upper surface 155 of the light guide plate 150.

The light exiting from the upper surface 155 travels in a direction inclined to the upper surface 155, and the reverse prism sheet changes the optical paths of the light to allow the light exiting from the upper surface 155 to travel in the direction substantially vertical to the lower surface of the display panel 120 (shown in FIG. 1).

Figure 5:
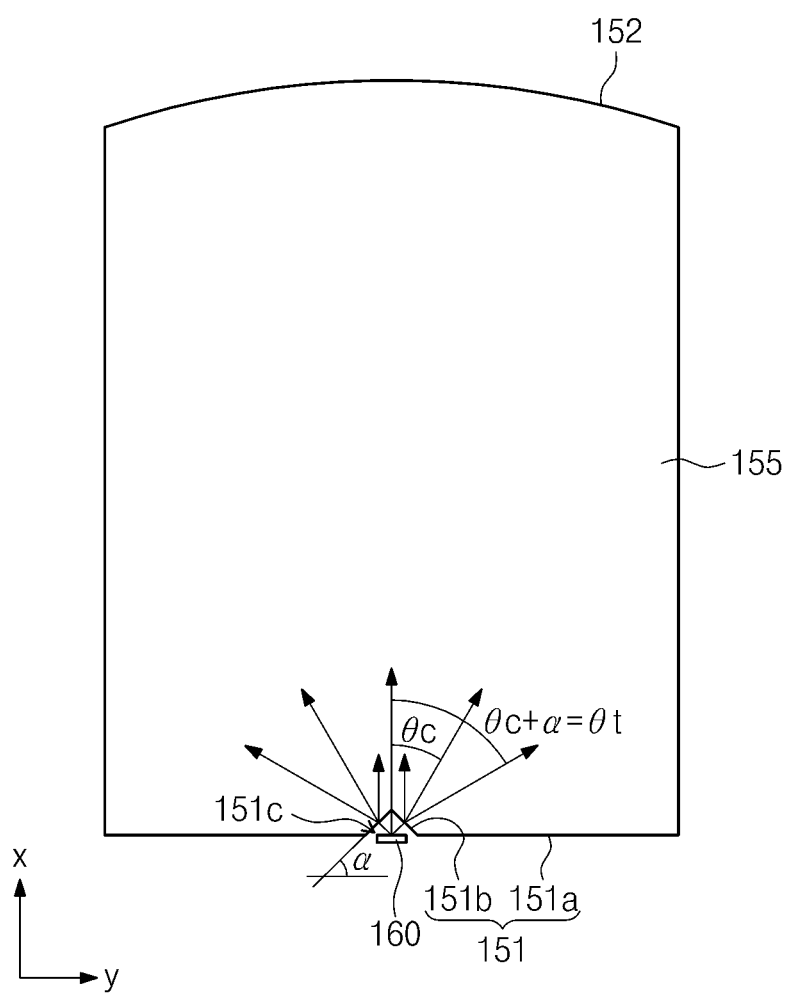
FIG. 5 is a plan view of the light guide plate shown in FIG. 2.

FIG. 5 is a plan view of the light guide plate shown in FIG. 2.

Referring to FIG. 5, the light source 160 is disposed at position corresponding to the optical recess 151c of the light guide plate 150.

The light emitted from the light source 160 is incident into the optical recess 151c, and then the optical path of the light incident into the optical recess 151c is changed by the second surfaces 151b.

In an exemplary embodiment, when an exit angle of the light emitted from the light source 160 is referred to as "θc" and an angle between each of the second surfaces 151b and the first surface 151a is referred to as "α", an exit angle θt of the light passing through the optical recess 151c satisfies the following Equation 1.

$$\theta t = \theta c + \alpha \quad \text{[Equation 1]}$$

In Equation 1, the exit angle θc denotes an angle between the light emitted from the light source and an imaginary normal line vertical to the first surface 151a.

According to Equation 1, as the angle α increases, the exit angle θt of the light passing through the optical recess 151c increases. In an exemplary embodiment, in which the optical recess 151c having the quadrangular pyramid is provided in the light incident surface 151 as shown in FIGS. 2 and 3, the light emitted from the light source 160 travels through the four second surfaces 151b, and thus the exit angle θt increases along the direction of the four second surfaces 151b. In such an embodiment, the exit angle θt emitted from the light source 160 increases along both upper and lower directions D1 and both left and right directions D2 with reference to the first surface 151a.

Figure 6A:
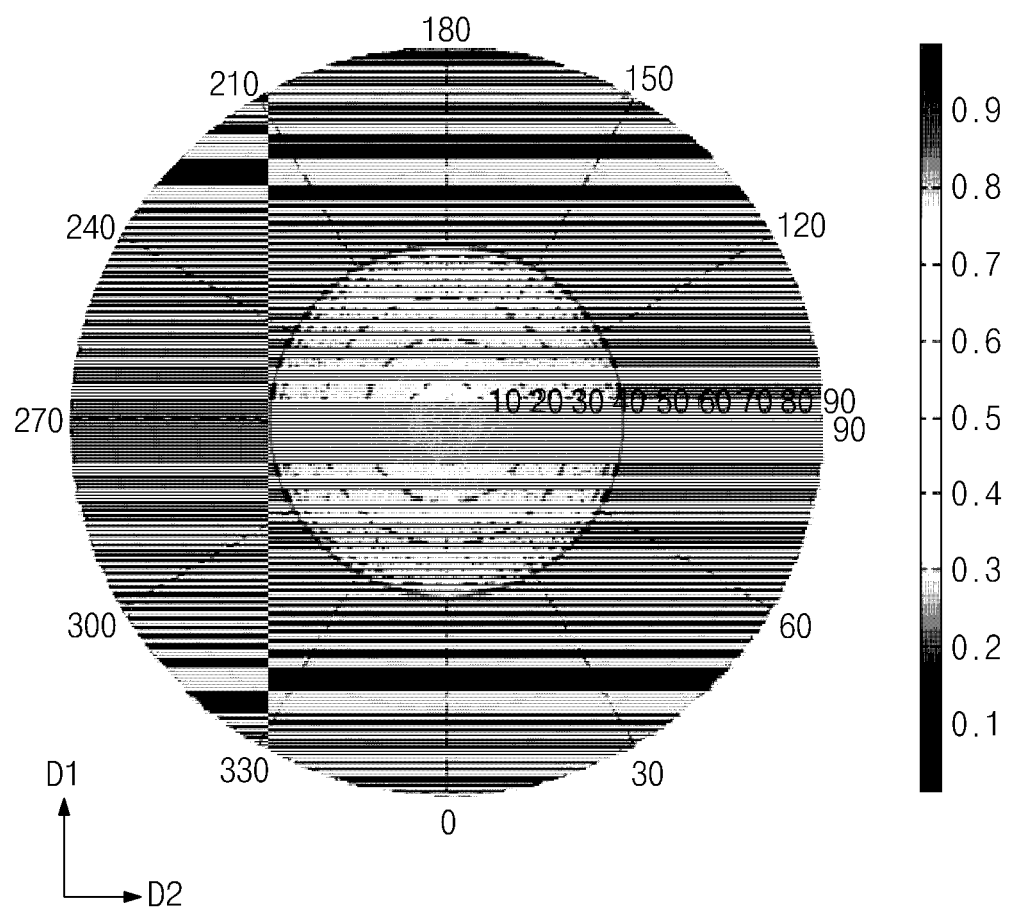
FIG. 6A is a diagram showing a brightness distribution of light incident into a light incident surface of an exemplary embodiment of a light guide plate in which an optical recess is not provided.
Figure 6B:
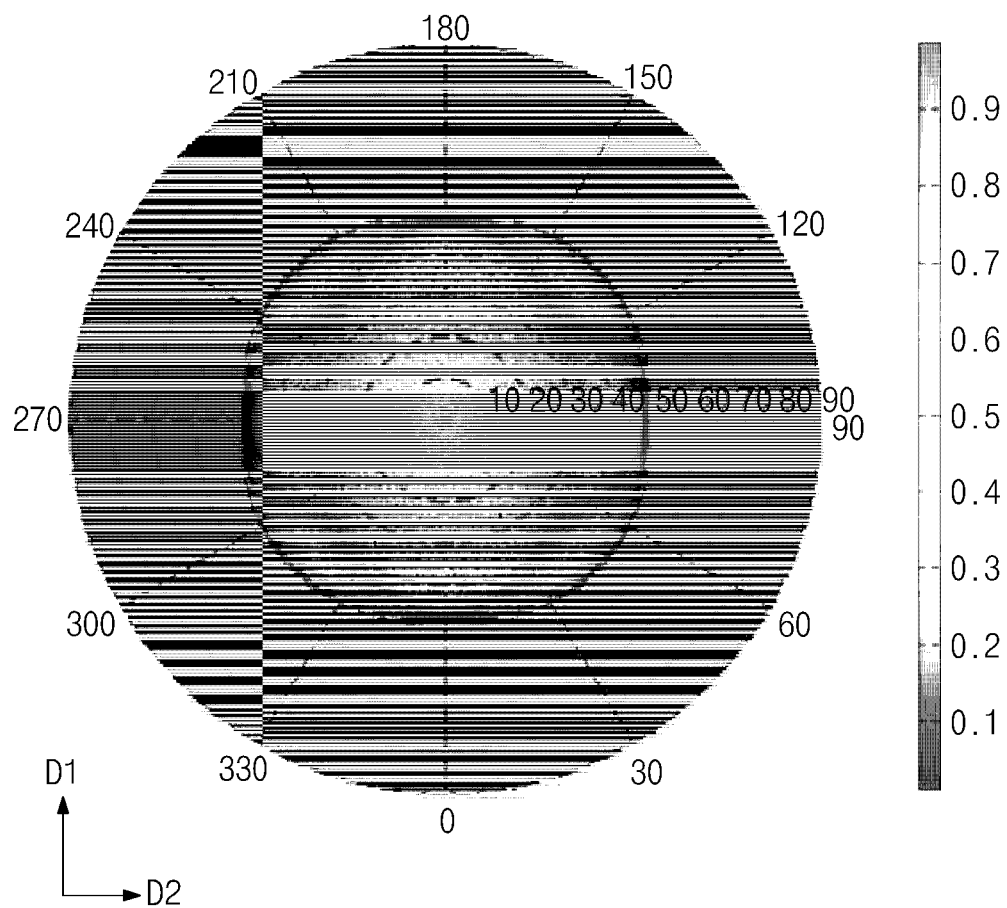
FIG. 6B is a diagram showing a brightness distribution of light passing through an optical recess of an exemplary embodiment of a light guide plate in which the optical recess has an angle ($\alpha$) of about 10 degrees.
Figure 6C:
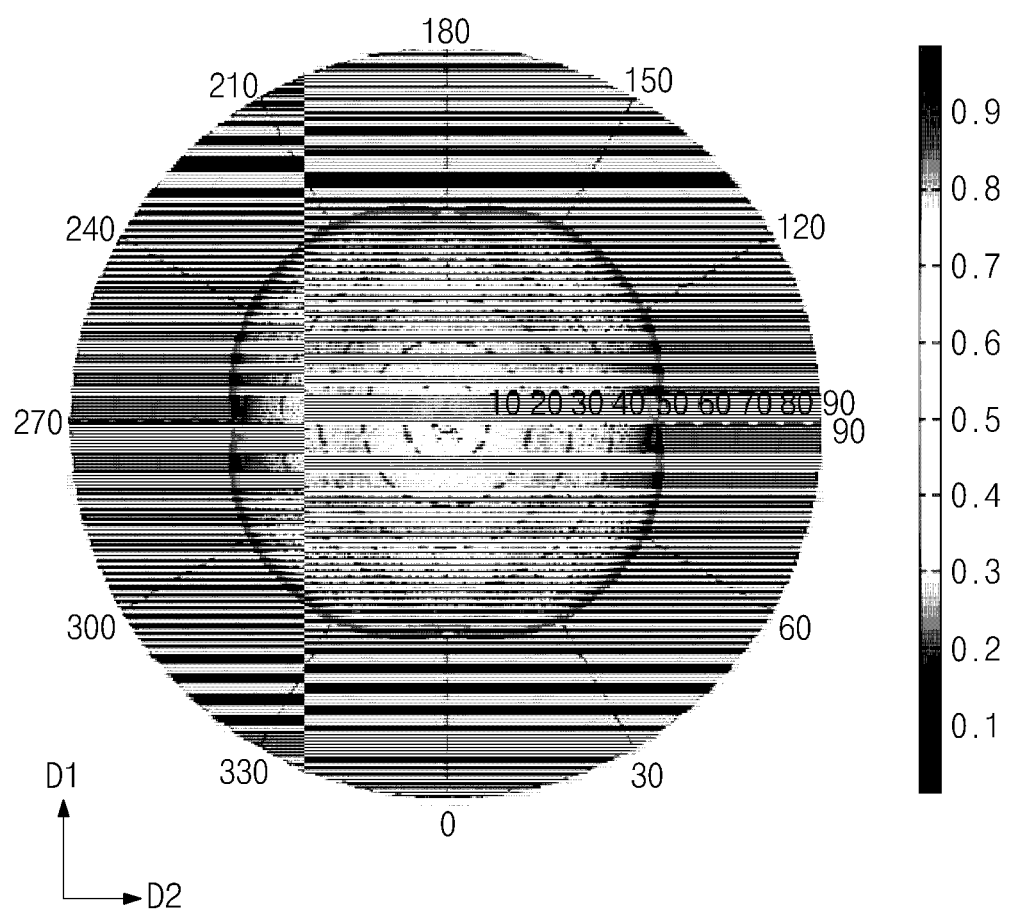
FIG. 6C is a diagram showing a brightness distribution of light passing through an optical recess of an exemplary embodiment of a light guide plate in which the optical recess has an angle ($\alpha$) of about 15 degrees.

FIG. 6A is a diagram showing a brightness distribution of light incident into a light incident surface of an exemplary embodiment of a light guide plate in which the optical recess is not provided, FIG. 6B is a diagram showing a brightness distribution of the light passing through the optical recess of an exemplary embodiment of a light guide plate in which the optical recess has the angle (α) of about 10 degrees, and FIG. 6C is a diagram showing a brightness distribution of the light passing through the optical recess of an exemplary embodiment of a light guide plate in which the optical recess has the angle (α) of about 15 degrees. In an exemplary embodiment including a wedge-type light guide plate, as described with reference to FIGS. 1 to 5, the brightness distribution of the light exiting from the upper surface 155 of the light guide plate 150 corresponds to the brightness distribution of the light incident into the light incident surface 151 of the light guide plate 150.

In an exemplary embodiment, the optical recess 151c shown in FIGS. 6B and 6C has the quadrangular pyramid defined by the second surfaces 151b, the length of the bottom side Lt of each of the second surfaces 151b is about 2 millimeters (mm), and the size of the light sources 160 is about 1 square millimeter ($mm^2$), e.g., 1 mm×1 mm.

Referring to FIG. 6A, in an exemplary embodiment where the optical recess 151c is not provided in the light guide plate 150, the light has a circular brightness distribution. In an exemplary embodiment, however, where the optical recess 151c is provided in the light incident surface 151 of the light guide plate 150, the light has a rectangular brightness distribution. In such an embodiment, as the angle α increases, the shape of the brightness distribution of the light exiting from the light guide plate 150 is gradually changed toward the rectangular shape. Referring to FIG. 5 and Equation 1, the exit angle θt emitted from the light source 160 increases along both of the upper and lower directions D1 and both of the left and right directions D2 while passing through the second surfaces 151b before the light is incident into the light guide plate 150, and dark areas existing at corners of the light guide plate 150 when viewed in a plan view may be substantially reduced. The reduction of the dark areas will be apparent with reference to FIGS. 7A and 7B.

Figure 7A:
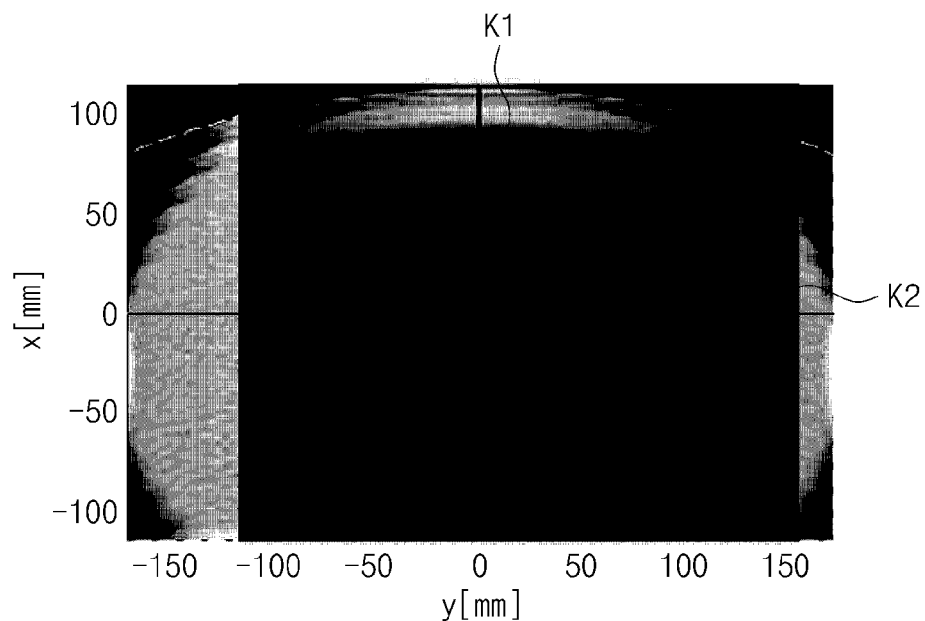
FIG. 7A is a diagram showing an exit light distribution of light exiting from an exemplary embodiment of a light guide plate in which an optical recess is not formed.
Figure 7B:
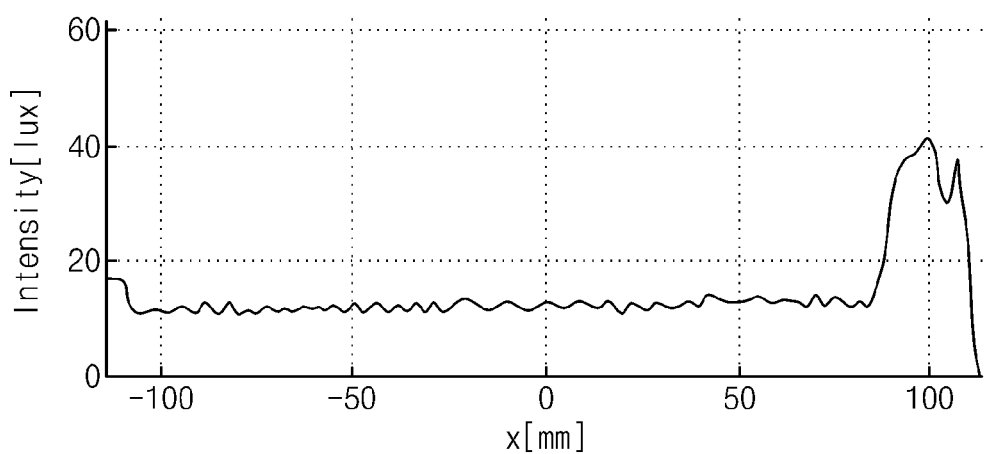
FIG. 7B is a graph showing intensity of light (lux) versus potion in k1 line (millimeter) of FIG. 7A.
Figure 7C:
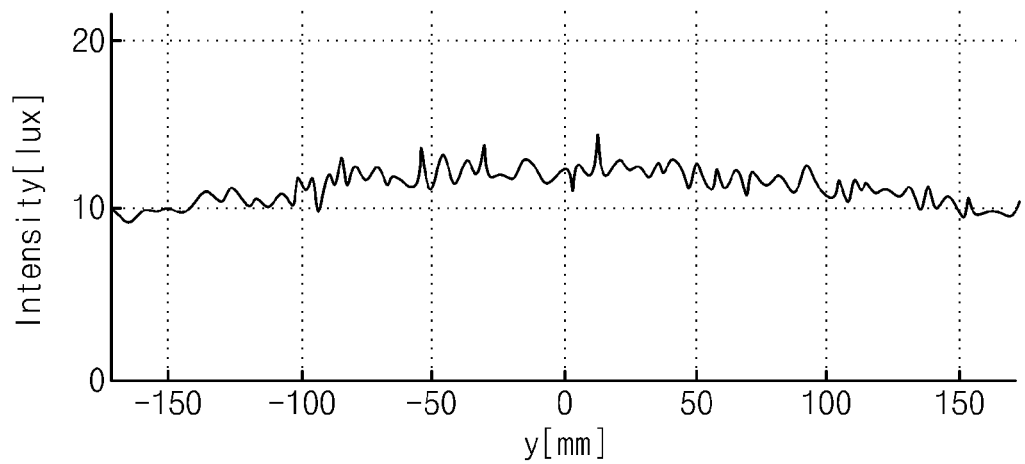
FIG. 7C is a graph showing intensity of light (lux) versus position in k2 line (millimeter) of FIG. 7A.
Figure 7D:
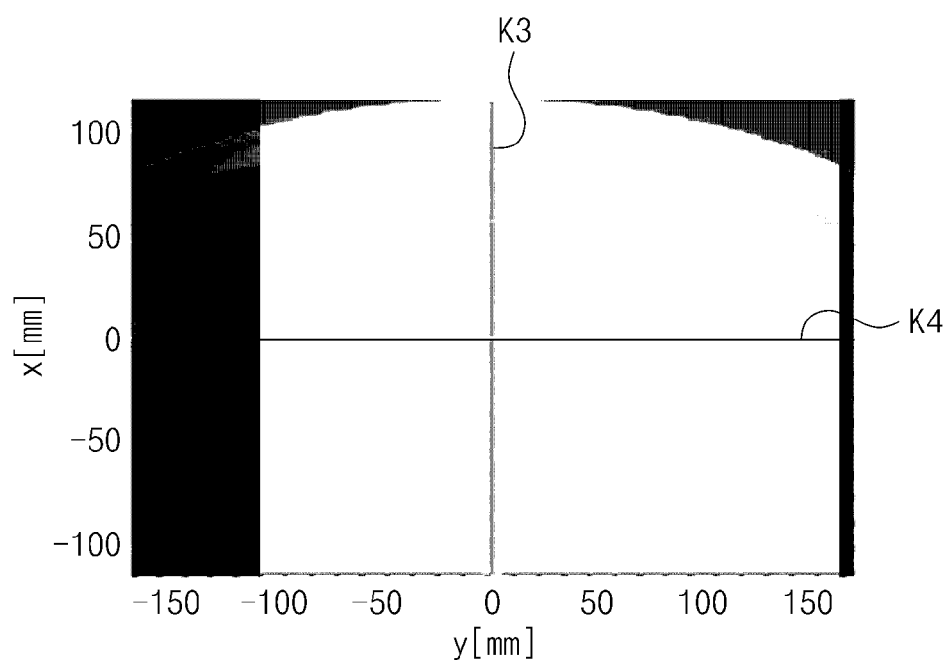
FIG. 7D is a view showing exit light distribution of an exemplary embodiment of a light guide plate in which an optical recess having an angle ($\alpha$) of about 10 degrees is provided.
Figure 7E:
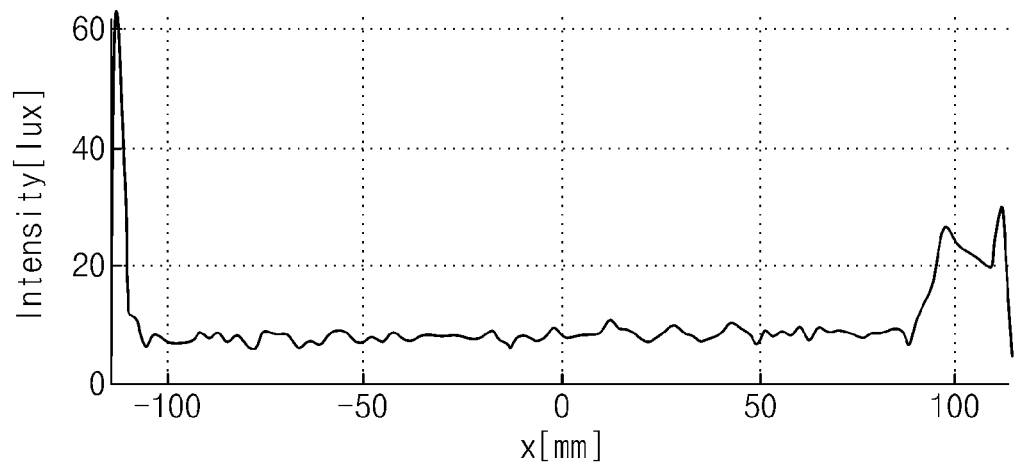
FIG. 7E is a graph showing intensity of light (lux) versus potion in k3 line (millimeter) of FIG. 7D.
Figure 7F:
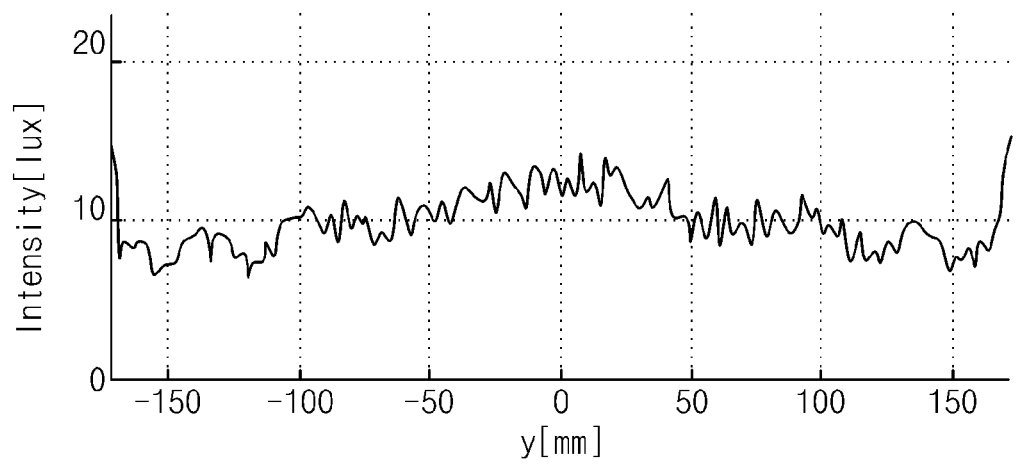
FIG. 7F is a graph showing intensity of light (lux) versus position in k4 line (millimeter) of FIG. 7A.

FIG. 7A is a diagram showing an exit light distribution of light exiting from an exemplary embodiment of the light guide plate in which the optical recess is not provided, FIG. 7B is a graph showing intensity of light (lux) versus position in k1 line (mm) of FIG. 7A, FIG. 7C is a graph showing intensity of light (lux) versus position in k2 line (mm) of FIG. 7A, FIG. 7D is a diagram showing an exit light distribution of an exemplary embodiment of the light guide plate in which the optical recess having the angle (α) of about 10 degrees is provided, FIG. 7E is a graph showing intensity of light (lux) versus position in k3 line (mm) of FIG. 7D, and FIG. 7F is a graph showing intensity of light (lux) versus position in k4 line (mm) of FIG. 7A. In such an embodiment, the optical recess 151c shown in FIG. 7B has the quadrangular pyramid defined by the second surfaces 151b, the length of the bottom side Lt of each of the second surfaces 151b is about 2 mm, and the size of the light sources 160 is about 1×1 $mm^2$.

Referring to FIGS. 7A to 7C, in an exemplary embodiment where the optical recess 151c is not provided in the light guide plate 150, the dark areas have been occurred at the corners of the light guide plate 150 when viewed in a plan view.

In an alternative exemplary embodiment, however, where the optical recess 151c having the angle α of about 10 degrees is provided in the light guide plate 150, as shown in FIGS. 7D to 7F, the size of the dark areas at the corners has been reduced.

That is, since the brightness distribution of the light passing through the optical recess 151c has the rectangular-like shape, the size of the dark areas may be reduced in the exit light distribution of the light exiting from the light guide plate 150.

In such an embodiment, the shape of the optical recess 151*c* and the angle α, which are defined by the second surfaces 151*b*, may be changed, and the exit light distribution of the light guide plate 150 may be thereby modified.

Figure 8:
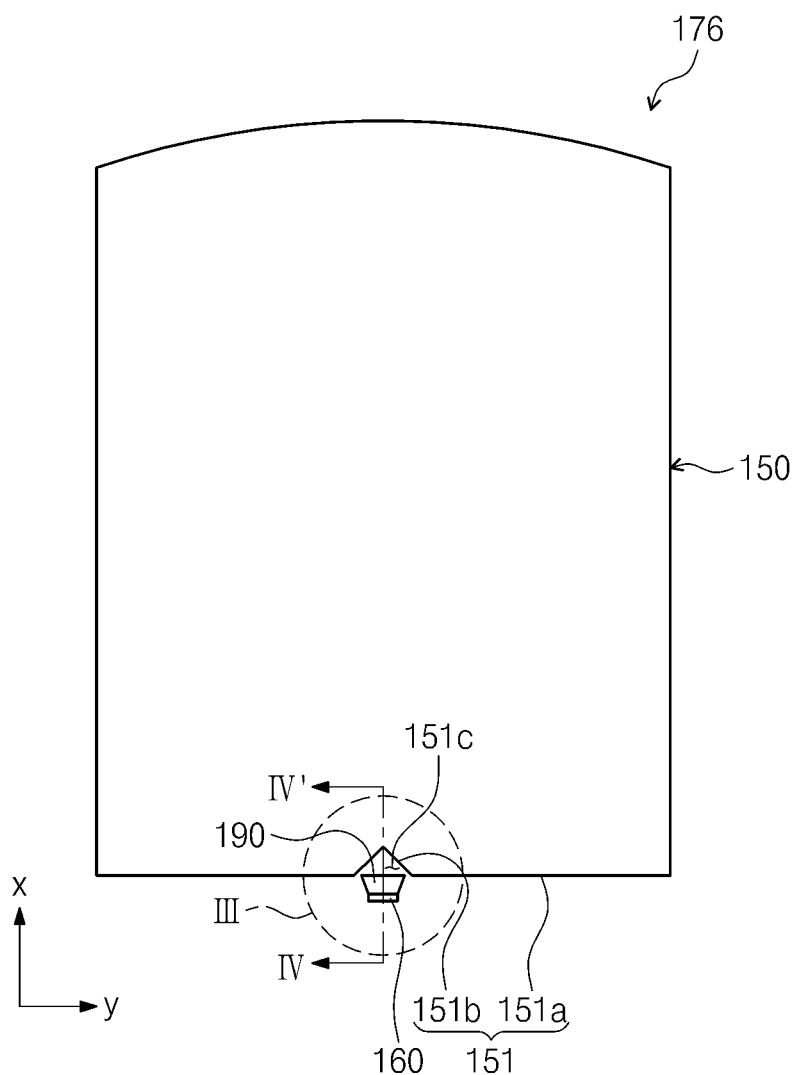
FIG. 8 is a plan view showing an exemplary embodiment of a backlight assembly according to the invention.
Figure 9:
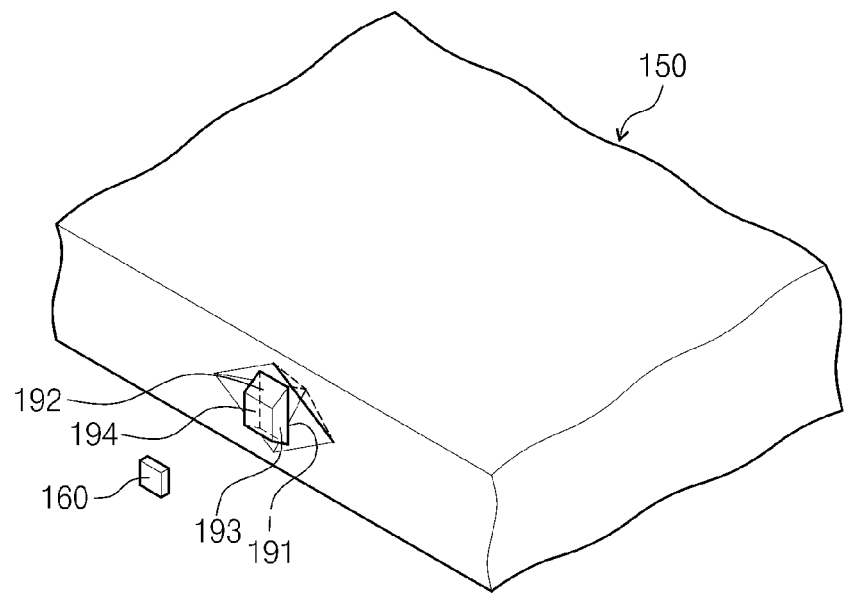
FIG. 9 is an enlarged perspective view of portion III of the backlight assembly shown in FIG. 8.
Figure 10:
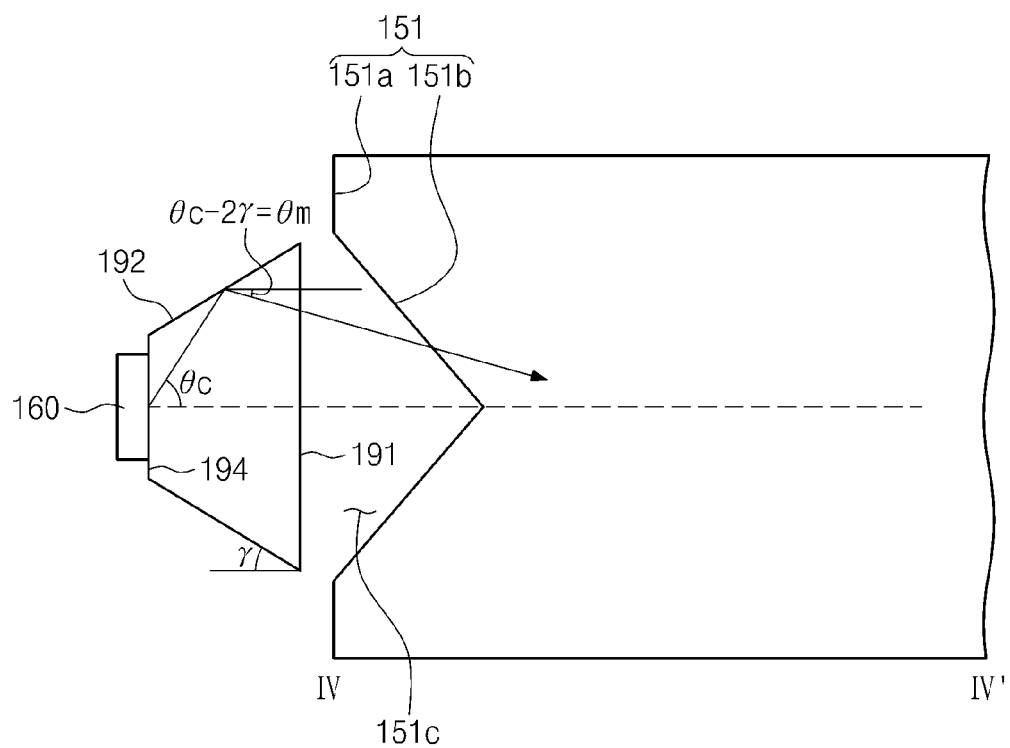
FIG. 10 is a cross-sectional view taken along line IV-IV' of the backlight assembly shown in FIG. 8.

FIG. 8 is a plan view of an exemplary embodiment of a backlight assembly according to the invention, FIG. 9 is an enlarged perspective view of portion III of the backlight assembly shown in FIG. 8, and FIG. 10 is a cross-sectional view taken along line IV-IV' of the backlight assembly shown in FIG. 8.

Referring to FIGS. 8 to 10, a backlight assembly 176 may further include a wedge-type reflector 190 between the light guide plate 150 and the light source 160.

The wedge-type reflector 190 is disposed between the second surface 151*b* and the light source 160. The wedge-type reflector 190 includes a third surface 191 substantially parallel to the first surface 151*a*, a plurality of fourth surfaces 192 inclined to the light source 160 from the third surface 191, a plurality of fifth surfaces 193 substantially vertical to the third surface 191 to serve as side surfaces thereof together with the fourth surfaces 192, and a sixth surface 194 substantially parallel to the third surface 191 and facing the light source 160.

In one exemplary embodiment, for example, the wedge-type reflector 190 may include two fourth surfaces 192 and two fifth surfaces 193. The two fourth surfaces 192 face each other in opposite directions, e.g., upper and lower directions, and the two fifth surfaces 193 face each other in opposite directions, e.g., left and right directions. In such an embodiment, the two fifth surfaces 193 are substantially parallel to the first connection surface 153 and the second connection surface 154 of the light guide plate 150, respectively.

In an exemplary embodiment, each of the third surface 191 and the fifth surface 193 has the rectangular shape, but a size of the third surface 191 is larger than a size of the fifth surface 193. When an angle between each of the fourth surfaces 192 and an imaginary normal line vertical to the third surface 191 is referred to as "γ" and an exit angle of the light emitted from the light source 160 is referred to as "θc" with respect to the imaginary normal line vertical to the third surface 191, an exit angle θm of the light reflected from each of the fourth surfaces 192 with respect to the imaginary normal line vertical to the third surface 191 satisfies the following Equation 2.

$$\theta m = \theta c - 2\gamma \qquad \text{[Equation 2]}$$

The light emitted from the light source 160 is incident into the wedge-type reflector 190, and the incident light into the wedge-type reflector 160 is reflected by the fourth surfaces 192 and the fifth surfaces 193.

In an exemplary embodiment, when the exit angle θc of the light emitted from the light source 160 is about 41 degrees and the angle γ between each of the fourth surfaces 192 and the normal line vertical to the third surface 191 is about 6 degrees, the exit angle θm of the light reflected from each of the fourth surfaces 192 becomes about 29 degrees. In such an embodiment, the light incident to the fifth surfaces 193 is reflected from the fifth surfaces 193 with the same exit angle as the incident angle.

The light emitted from the light source 160 in the upper and lower directions may be condensed by the fourth surfaces 192. Thus, the light emitted from the light source 160 may be effectively prevented from exiting through specific areas along the vertical direction (e.g., x-direction as shown in FIG. 8) on the upper surface 155 of the light guide plate 150, and the light amount of the light exiting through the upper surface 155 of the light guide plate 150 is thereby substantially improved.

Figure 11:
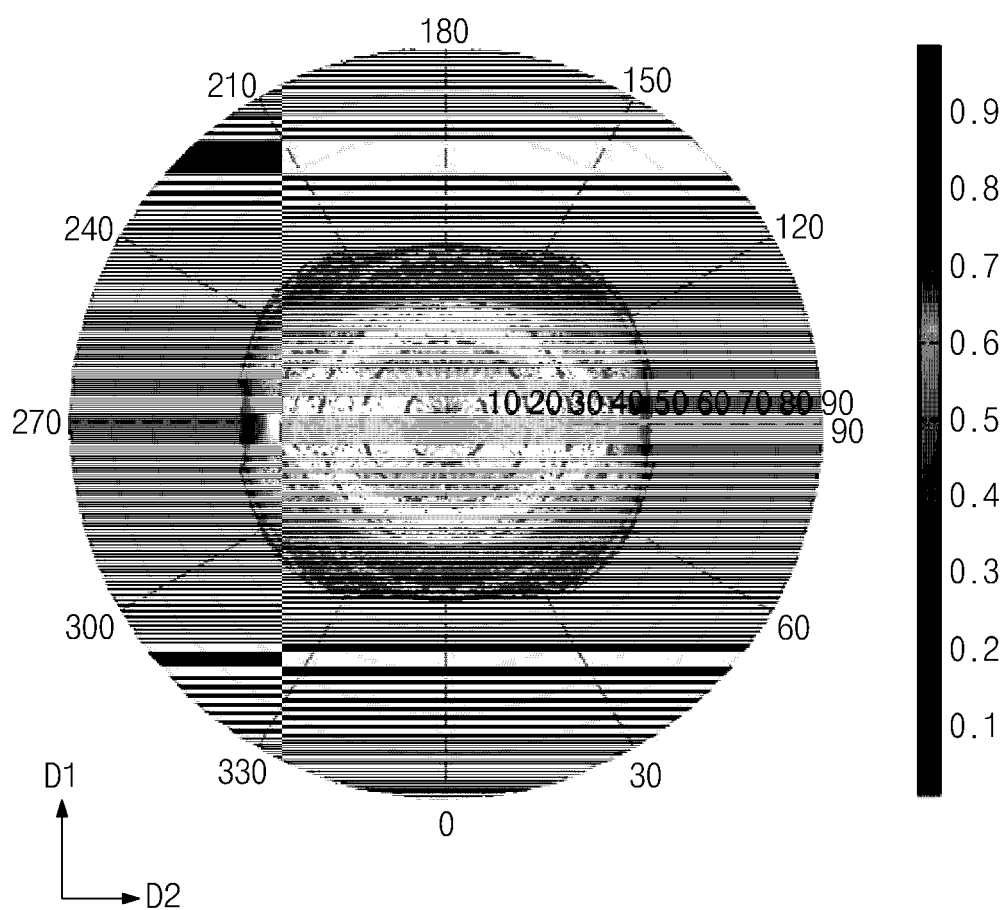
FIG. 11 is a diagram showing a brightness distribution passing thorough an optical recess of an exemplary embodiment of the light guide plate which represents the brightness distribution shown in FIG. 6B and further includes a wedge-type reflector shown in FIG. 8.
Figure 12A:
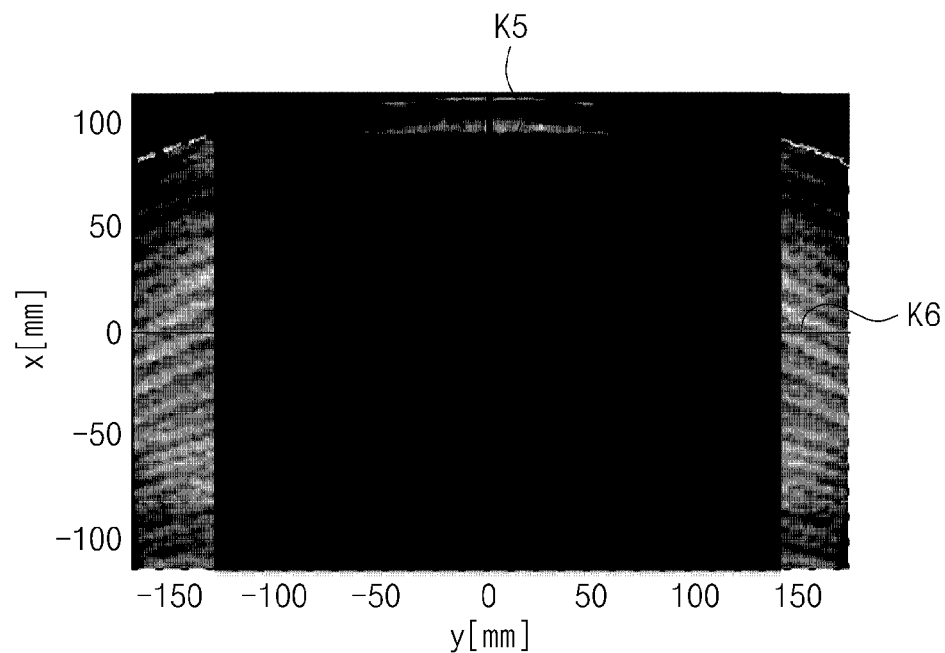
FIG. 12A is a diagram showing exit light distribution of the light guide plate of FIG. 11.
Figure 12B:
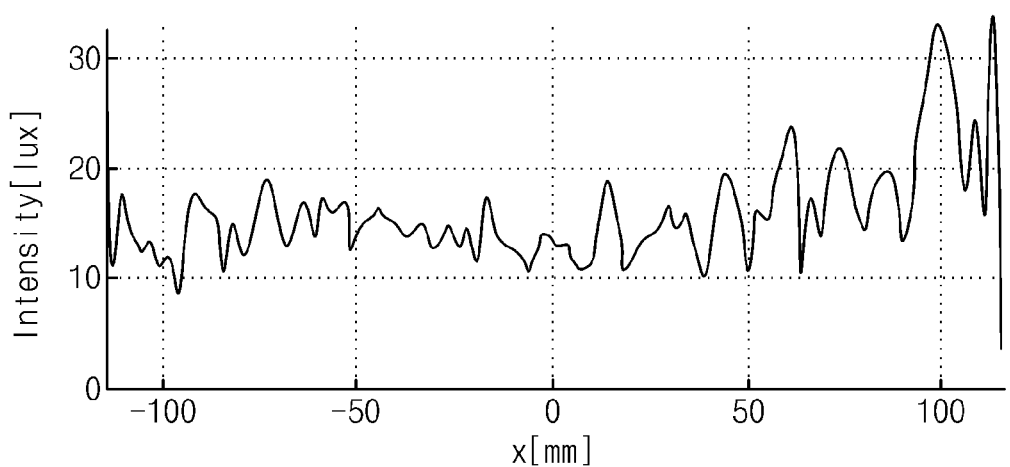
FIG. 12B is a graph showing intensity of light (lux) versus position in k5 line (millimeter) of FIG. 12A.
Figure 12C:
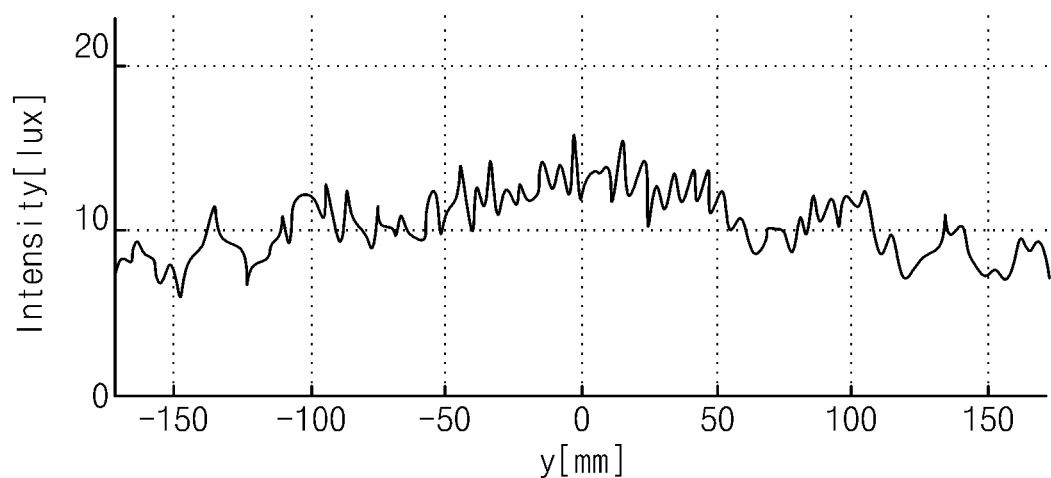
FIG. 12C is a graph showing intensity of light (lux) versus position in k6 line (millimeter) of FIG. 12A.

FIG. 11 is a diagram showing a brightness distribution passing through an optical recess of an exemplary embodiment of the light guide plate which represents the brightness distribution shown in FIG. 6B and further includes the wedge-type reflector shown in FIG. 8, FIG. 12A is a diagram showing an exit light distribution of the light guide plate of FIG. 11, FIG. 12B is a graph showing intensity of light (lux) versus position in k5 line (mm) of FIG. 12A, and FIG. 12C is a graph showing intensity of light versus position in k6 line (mm) of FIG. 12A.

As shown in FIG. 11, in an exemplary embodiment where the backlight assembly 176 further includes the wedge-type reflector 190, the brightness distribution of the light passing through the optical recess has the shape substantially closer to the rectangular shape than the shape of the brightness distribution of the light shown in FIG. 6B. In such an embodiment, the light passing through the optical recess is condensed in the upper and lower directions by the fourth surfaces 192 of the wedge-type reflector 190, and the amount of the light leaking from a portion along the vertical direction ("x" as shown in FIG. 8) on the upper surface 155 of the light guide plate 150 and hot spots may be reduced.

In an exemplary embodiment, the intensity of light is reduced when an x-coordinate of FIG. 12B has a value of 100 or −100 than the intensity of light when an x-coordinate of FIG. 7E has a value of 100 or −100, respectively. In an exemplary embodiment where the backlight assembly 176 further includes the wedge-type reflector 190, the hot spots on areas near the light incident surface 151 and the opposite surface 152 are substantially reduced.

Figure 13:
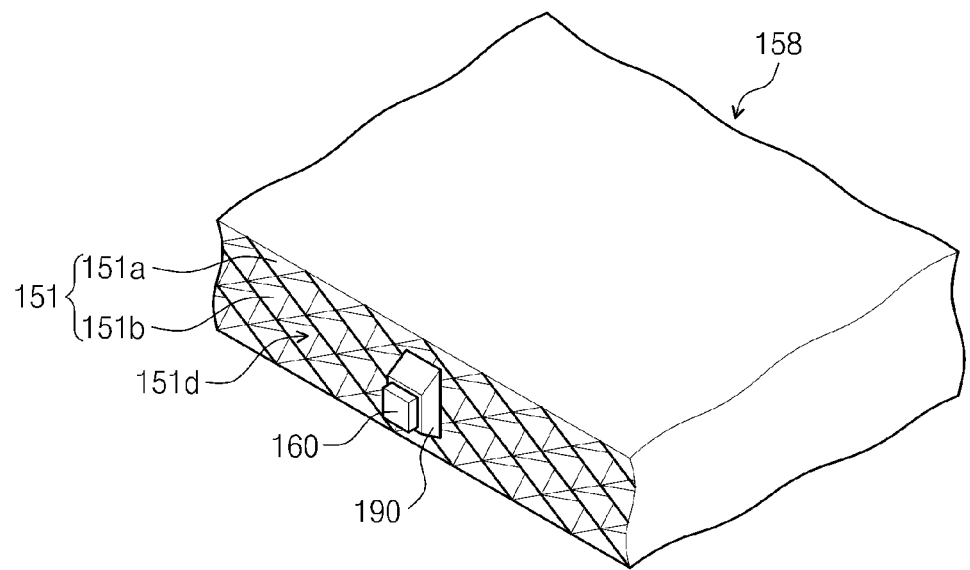
FIG. 13 is a perspective view of a portion of an alternative exemplary embodiment of a backlight assembly according to the invention.

FIG. 13 is a perspective view of a portion of an alternative exemplary embodiment of a backlight assembly according to the invention. In FIG. 13, the same reference numerals denote the same elements in FIG. 3, and any repetitive detailed description will hereinafter be omitted or simplified.

Referring to FIG. 13, an exemplary embodiment of a backlight assembly includes a light source 160 and a light guide plate 158, and the light guide plate 158 includes a light incident surface 151, an opposite surface, first and second connection surfaces 153 and 154, an upper surface 155, and a lower surface 156. The backlight assembly may further include the wedge-type reflector 190 shown in FIGS. 8 to 10.

The light incident surface 151 faces the light source 160, and the light emitted from the light source 160 is incident into the light incident surface 151.

The light incident surface 151 of the light guide plate 158 includes a first surface 151*a* and a plurality of second surfaces 151*b* inclined to the opposite surface 152 from the first surface 151*a* in an area corresponding to the light source 160. In an exemplary embodiment, a plurality of optical recesses 151*d*, each having the polygonal pyramid, is defined by the second surfaces 151*b* at the light incident surface 151 of the light guide plate 158. In such an embodiment, the optical recesses 151*d* are recessed to the opposite surface 152 from the light incident surface 151 and have the polygonal pyramid shape.

In one exemplary embodiment, for example, the light incident surface 151 includes four second surfaces 151*b*, and the light incident surface 151 is provided with a plurality of optical recesses 151*d*, each having a quadrangular pyramid shape defined by the four second surfaces 151*b*.

In an exemplary embodiment, each of the optical recesses 151*d* may have a size smaller than a size of the light source 160. In such an embodiment, the length of the bottom side of each of the second surfaces 151b defining the optical recesses 151d is smaller than the size of the light source 160.

Although the size of each optical recess 151d is smaller than the light source 160, the light emitted from the light source 160 may be diffused by the optical recesses 151d. Since each of the optical recesses 151d have the same structure and function as a structure of the optical recess 151c shown in FIGS. 2 and 3, detailed description of the optical recesses 151d will be omitted.

Figure 14:
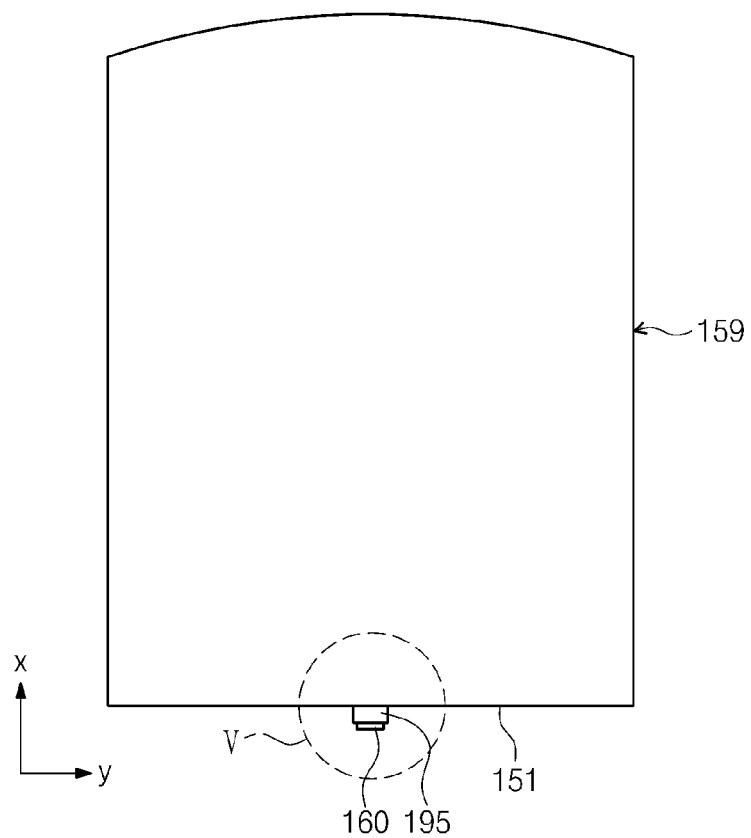
FIG. 14 is a plan view of another alternative exemplary embodiment of a backlight assembly the invention.
Figure 15:
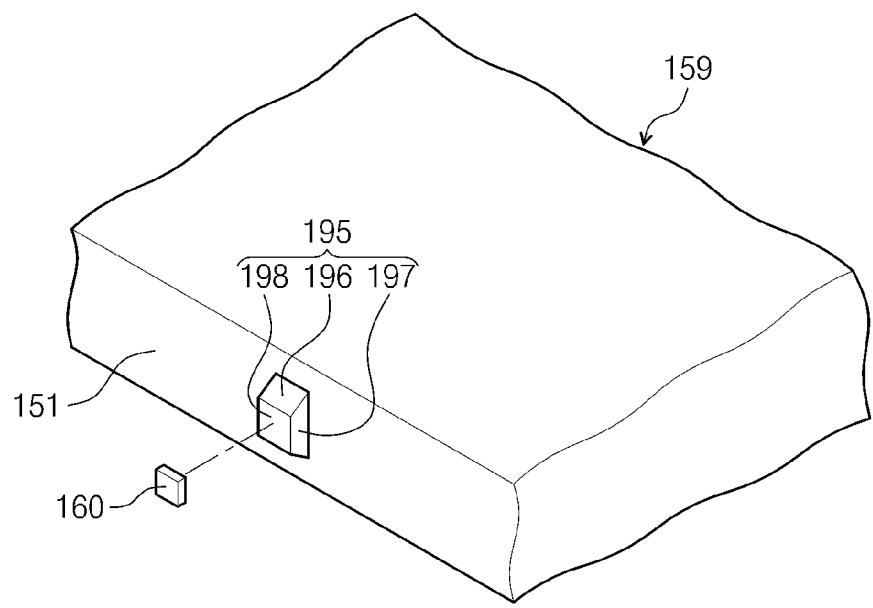
FIG. 15 is an enlarged perspective view of portion V of the backlight assembly shown in FIG. 14.

FIG. 14 is a plan view of another alternative exemplary embodiment of a backlight assembly according to the invention and FIG. 15 is an enlarged perspective view of portion V of the backlight assembly shown in FIG. 14.

Referring to FIGS. 14 and 15, a backlight assembly includes a light source 160 and a light guide plate 159, and the light guide plate 159 includes a wedge-type protrusion 195 protruded from the light incident surface 151 of the light guide plate 159 to the light source 160.

The wedge-type protrusion 195 includes a plurality of inclined surfaces 196 inclined to the light source 160 from the light incident surface 151, a plurality of vertical surfaces 197 substantially vertical to the light incident surface 151 to form side surfaces of the wedge-type protrusion 195 together with the inclined surfaces 196, and a plane surface 198 substantially parallel to the light incident surface 151 and connected to the inclined surfaces 196 and the vertical surfaces 197. The light source 160 is disposed facing the plane surface 198 of the wedge-type protrusion 195. In one exemplary embodiment, the wedge-type protrusion 195 has two inclined surfaces 196 and two vertical surfaces 197.

The light emitted from the light source 160 is incident to the inclined surfaces 196 after passing through the plane surface 198, and the direction in which the light travels is changed according to the inclination angle γ of each inclined surface 196. In such an embodiment, the light emitted from the light source 160 may be condensed by the wedge-type protrusion 195, the light emitted from the light source 160 may be effectively prevented from exiting toward specific areas, and the light amount of the light exiting through the upper surface 155 of the light guide plate 159 is thereby enhanced.

Figure 16:
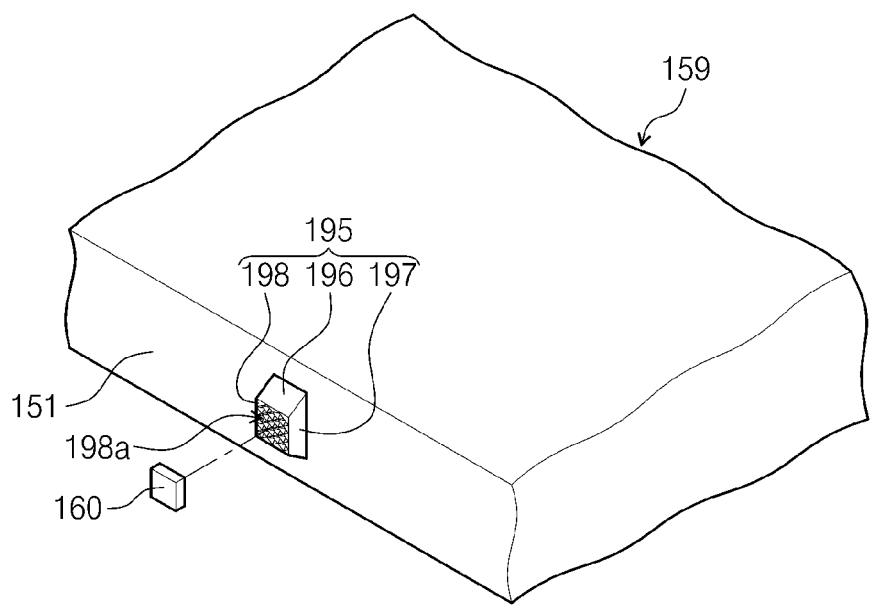
FIG. 16 is a perspective view of a portion of another alternative exemplary embodiment of a backlight assembly the invention.

FIG. 16 is a perspective view of a portion of another alternative exemplary embodiment of a backlight assembly according to the invention. In FIG. 16, the same reference numerals denote the same elements in FIG. 15, and any repetitive detailed description of the same elements will be omitted or simplified.

Referring to FIG. 16, a light guide plate 159 includes a wedge-type protrusion 195 protruded to the light source 160 from the light incident surface 151 thereof.

The wedge-type protrusion 195 includes two inclined surfaces 196 inclined to the light source 160 from the light incident surface 151, two vertical surface 197 substantially vertical to the light incident surface 151, and a plane surface 198 substantially parallel to the light incident surface 151 and connected to the inclined surfaces 196 and the vertical surfaces 197. The light source 160 is disposed to face the plane surface 198 of the wedge-type protrusion 195.

The wedge-type protrusion 195 is provided with a plurality of optical recesses 198a recessed inward from the plane surface 198. Each of the optical recesses 198a may have a polygonal pyramid shape. In one exemplary embodiment, for example, each of the optical recesses 198a has a quadrangular pyramid shape.

The light emitted from the light source 160 is scattered by the optical recesses 198a. Each of the optical recesses 198a has the same structure and function as those of the optical recess 151c shown in FIGS. 2 and 3, and thus detailed description of the optical recesses 198a will be omitted.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display apparatus comprising:
   at least one light source which emits light;
   a light guide plate which has a plurality of surfaces and guides the light from the at least one light source;
   a display panel which receives the light from the light guide plate and displays an image,
   wherein the plurality of surfaces comprises:
      a light incident surface facing the at least one light source and which receives the light; and
      an upper surface connected to the light incident surface and which outputs the light, and
   wherein the light incident surface of the light guide plate comprises:
      a first surface extending in a predetermined direction; and
      a plurality of second surfaces inclined from the first surface in an area corresponding to the light source such that at least one optical recess having a polygonal pyramid shape is defined by the second surfaces on the light incident surface; and
   an optical member comprising:
      a third surface between the light incident surface and the light source and substantially parallel to the first surface of the light incident surface;
      a fourth surface opposite to the third surface and facing the light source;
      a plurality of fifth surfaces inclined from the third surface and which connects the third surface with the fourth surface; and
      a plurality of sixth surfaces substantially vertical to the third surface and which connects the third surface with the fourth surface.

2. The display apparatus of claim 1, wherein, when an exit angle of the light emitted from the light source is θc and an angle between each of the second surfaces and an imaginary line parallel to the first surface is α, an exit angle θt of the light passing through the optical recess satisfies the following equation: θt=θc+α.

3. The display apparatus of claim 2, wherein the optical recess has a quadrangular pyramid shape.

4. The display apparatus of claim 3, wherein the plurality of surfaces further comprises an opposite surface opposite to the light incident surface to reflect the light and having an arc shape, and wherein the light source comprises a light emitting diode positioned at a focal length of the opposite surface.

5. The display apparatus of claim 4, wherein the light emitting diode has a size smaller than a size of the optical recess.

6. The display apparatus of claim 4, wherein the light guide plate has a thickness gradually increased from the light incident surface to the opposite surface.

7. The display apparatus of claim 4, further comprising a reverse prism sheet between the light guide plate and the display panel, wherein the reverse prism sheet includes a plurality of prism patterns on a surface thereof opposite to the upper surface of the light guide plate.

8. The display apparatus of claim 4, wherein the plurality of surfaces further comprises two connection surfaces disposed at both sides of the light incident surface and the opposite surface, wherein the two connection surfaces are substantially parallel to each other.

9. The display apparatus of claim 1, wherein the sixth surfaces are substantially vertical to the light incident surface.

10. The display apparatus of claim 1, wherein, when an exit angle of the light emitted from the light source is $\theta c$ and an angle between each of the fifth surfaces and a normal line vertical to the third surface is $\gamma$, an exit angle $\theta m$ of the light reflected from each of the fifth surfaces satisfies the following equation: $\theta m = \theta c - 2\gamma$.

* * * * *